(12) United States Patent
Ward et al.

(10) Patent No.: US 11,640,292 B2
(45) Date of Patent: May 2, 2023

(54) SYSTEMS AND METHODS FOR IOT DEVICE LIFECYCLE MANAGEMENT

(71) Applicant: Verizon Patent and Licensing Inc., Basking Ridge, NJ (US)

(72) Inventors: Rachel Y. Ward, Lewisville, TX (US); Ning Zhang, Warren, NJ (US); Ye Huang, San Ramon, CA (US); Prema Kumar Yendrapati, San Ramon, CA (US); Brian Matthew White, Port Murray, NJ (US); Khamis I. Abulgubein, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/314,232

(22) Filed: May 7, 2021

(65) Prior Publication Data

US 2022/0357939 A1    Nov. 10, 2022

(51) Int. Cl.
| | |
|---|---|
| *G06F 8/65* | (2018.01) |
| *G16Y 10/75* | (2020.01) |
| *G16Y 30/00* | (2020.01) |
| *H04L 67/06* | (2022.01) |
| *H04L 67/303* | (2022.01) |
| *H04L 67/00* | (2022.01) |

(52) U.S. Cl.
CPC ............... *G06F 8/65* (2013.01); *G16Y 10/75* (2020.01); *G16Y 30/00* (2020.01); *H04L 67/06* (2013.01); *H04L 67/303* (2013.01); *H04L 67/34* (2013.01)

(58) Field of Classification Search
CPC ....... H04L 67/06; H04L 67/303; H04L 67/34; G06F 8/65; G06F 21/44; G06F 21/572; G06F 8/654; G06F 8/71; G16Y 30/00; G16Y 10/75
See application file for complete search history.

(56) References Cited

U.S. PATENT DOCUMENTS

| | | | | |
|---|---|---|---|---|
| 2010/0317371 | A1* | 12/2010 | Westerinen | H04M 1/72451 455/456.6 |
| 2011/0219367 | A1* | 9/2011 | Lee | H04L 67/34 717/173 |
| 2017/0019853 | A1* | 1/2017 | Ghosh | H04W 52/0216 |
| 2019/0042228 | A1* | 2/2019 | Nolan | G06F 8/64 |
| 2019/0129706 | A1* | 5/2019 | Vangeel | G06F 8/63 |
| 2020/0326924 | A1* | 10/2020 | A | H04L 41/082 |
| 2020/0379744 | A1* | 12/2020 | Bhupati | G06F 11/0793 |
| 2020/0409690 | A1* | 12/2020 | Rouland | H04L 9/3236 |

* cited by examiner

*Primary Examiner* — S. Sough
*Assistant Examiner* — Cheneca Smith (57) ABSTRACT

Systems and methods described herein provide for generating behavior profiles for a plurality of end devices associated with an end user; receiving, from the end user, a request for an over-the-air (OTA) update for the plurality of end devices; generating an OTA update campaign plan based on the behavior profiles responsive to the request; providing the OTA update campaign plan to the end user; receiving, from the end user, a modified request for the OTA update; and generating an OTA update campaign schedule responsive to the modified request.

20 Claims, 7 Drawing Sheets

SYSTEMS AND METHODS FOR IOT DEVICE LIFECYCLE MANAGEMENT

BACKGROUND INFORMATION

To address the evolving demands of users of mobile communication devices, wireless communication providers continue to improve and expand available services, as well as networks for delivering such services. Ongoing service evolution includes the development of wireless access networks as well as options for their use. A mobile network operator typically manages a large number of end devices accessing varied services using limited radio connectivity resources throughout a service coverage area. Network access and service administration for a large number of devices (e.g., massive Internet of things (IoT) devices) across a network poses various technological challenges, particularly with respect to lifecycle management of such devices.

DETAILED DESCRIPTION

The following detailed description refers to the accompanying drawings. The same reference numbers in different drawings identify the same or similar elements. Also, the following detailed description does not limit the invention.

Wireless access networks traditionally designed to support mobile devices, such as smart phones, are increasingly being used to also support IoT-related applications. The transition has led to a growing presence of IoT devices employing machine-to-machine (M2M) communications, such as machine-type communications (MTC), to permit communication among IoT devices without direct user interaction. IoT applications enable a wide variety of implementations, ranging from fixed installations of utility meters, environmental sensors, parking meters, and/or occupancy sensors, remote actuators, security sensors, smart lighting, traffic cameras, advertising displays, point-of-sale terminals, vending machines, remote diagnostics systems, power grid telemetry and/or management devices, and the like, to mobility trackers, high-velocity autonomous vehicles and aerial drones. IoT usage is expected to increase exponentially to an inestimable number of IoT devices being serviced across a given wireless access network. Network infrastructures may support an increase in the number of IoT devices within a wireless operator's network to millions of devices communicating with one another autonomously with little-to-no user intervention. Thus, wireless communications provisioning will involve the challenge of managing wireless access networks that service massive IoT.

A technology developed for IoT applications which requires substantially less data and is based on a low power wide area network (LPWAN) design is Long Term Evolution (LTE) Category M1 (CAT-M1). CAT-M1 channels, sometimes referred to as enhanced MTC (eMTC) channels, use a total bandwidth of 1.4 megahertz (MHz) and have a comparably low power requirement to that of an LTE channel. Another technology, developed for IoT applications, requiring significantly less data and/or power, is narrow band (NB) IoT (NB-IoT) technology.

The firmware of an IoT device may control the low-level operation of its hardware and lifecycle management may include periodic upgrading and/or on-demand updating of its firmware. The scale of such upgrades may involve receiving—by a massive number of IoT devices deployed on a single network, or even attached to the same base station—a sizable amount of data within a relatively short and preferably uninterrupted timeframe. For example, an entity managing a number of IoT devices may initiate a wireless update campaign, also referred to as an over-the-air (OTA) update campaign. One particular type of OTA update that may involve the sustained transfer of a large file may be a FOTA update. Other types of OTA updates that may include the transfer of a large file may be a baseband OTA update or an application software OTA update. The terms "update" and "upgrade" are used interchangeably herein.

The number of concurrent successful attachments of CAT-M1 and/or NB-IoT devices to a serving base station, or to the number of simultaneous downloads of a FOTA update file via the serving base station, may be limited. The typically lengthy download times associated with FOTA updates may be exponentially longer—up to infeasibility—at locations such as extended RF coverage areas with extremely poor RF connectivity conditions (e.g., low signal-to-interference-noise-ratio (SINR), low reference signals received power (RSRP), etc.). RF link signaling overhead is further increased by interruptions to FOTA update downloads and subsequent restarting of the FOTA update download multiple times. Thus, when an original equipment manufacturer (OEM), an IoT deployment manager, or other enterprise subscriber, decides to enhance existing or add new functionalities, address security vulnerabilities, or obtain bug fixes for the IoT devices, the resources of a serving base station may be strained and susceptible to the point of RF link failure.

Approaches to executing FOTA updates for massive IoT are advantageously capable of scaling. However, current FOTA delivery solutions typically lack device and/or network context when scheduling the FOTA updates. That is, FOTA systems obtain a device list from IoT administrators and correspondingly alert the IoT devices to download the FOTA update at the IoT administrator's requested time—irrespective of air interface and/or network conditions. FOTA updates that are scheduled for times and/or RF coverage locations that correspond to less-than-optimal network connectivity may incur unacceptable FOTA delivery failure rates.

FOTA delivery failures may occur due to factors such as 1) high density connectivity already present in a coverage area at a location of one or more FOTA target device (i.e., other devices competing for limited RF resources, 2) high density connectivity created in a coverage area by executing a FOTA update at a location of one or more FOTA target device (i.e., a transient consumption of limited RF resources), 3) poor connectivity conditions in a coverage area at a scheduled time of day for FOTA file delivery (e.g., during business hours, etc.), 4) unresponsiveness of one or more FOTA target devices (e.g., sleeping state, active mobile tracking state, etc.), and/or 5) unawareness of one or more FOTA target device RAT profiles (e.g., CATM user plan, NB-IoT non-IP data delivery (NIDD), etc.).

Implementations described herein relate to FOTA updating of target user equipment (UE) devices. For example, the target UE devices may be CAT-M1 devices, NB-IoT devices, and/or another type of end device. A FOTA agent may be configured to provide on-demand and/or scheduled service to coordinate FOTA updates, and/or other types of OTA updates that may include a large file transfer, to a set of UE devices without overloading the resources of one or more serving base stations. The FOTA campaign agent may be configured to—responsive to a triggering event—implement multi-stage scheduling of FOTA activity using machine-learning based on information identifying a local RF environment within a radio access network (RAN), and device characteristics of target UE devices for the FOTA update.

Functions of the FOTA campaign agent may be implemented using existing base stations and/or dedicated FOTA components. For example, the FOTA campaign agent may reside in a network provider's public land mobile network (PLMN) and may be backhauled to the network provider's core network (e.g., an EPC, a 5G core network, etc.). In other implementations, the FOTA campaign agent may be located at a multi-access edge computing (MEC) network. The FOTA campaign agent may include a transceiver device that is capable of transmitting a directional antenna pattern and/or narrow or fine antenna beam patterns of a particular power range and spectrum toward target devices while minimizing interference to other devices serviced by a cell associated with an antenna array wireless transceiver. A narrow or sharpened antenna beam may be associated with higher antenna gain and finer spatial granularity, resulting in improved RF link quality and/or higher capacity.

In implementations described herein, the FOTA campaign agent may schedule FOTA update activity based on the network loading conditions and/or local RF conditions with respect to the size of the FOTA update file. In still other implementations, the FOTA campaign agent may provide the FOTA campaign requester with a preliminary FOTA delivery plan that permits review of the planned delivery schedule and an opportunity to alter the campaign request and/or adjust the UE device behavior, for example, with respect to sleep timers, etc.

Figure 1:
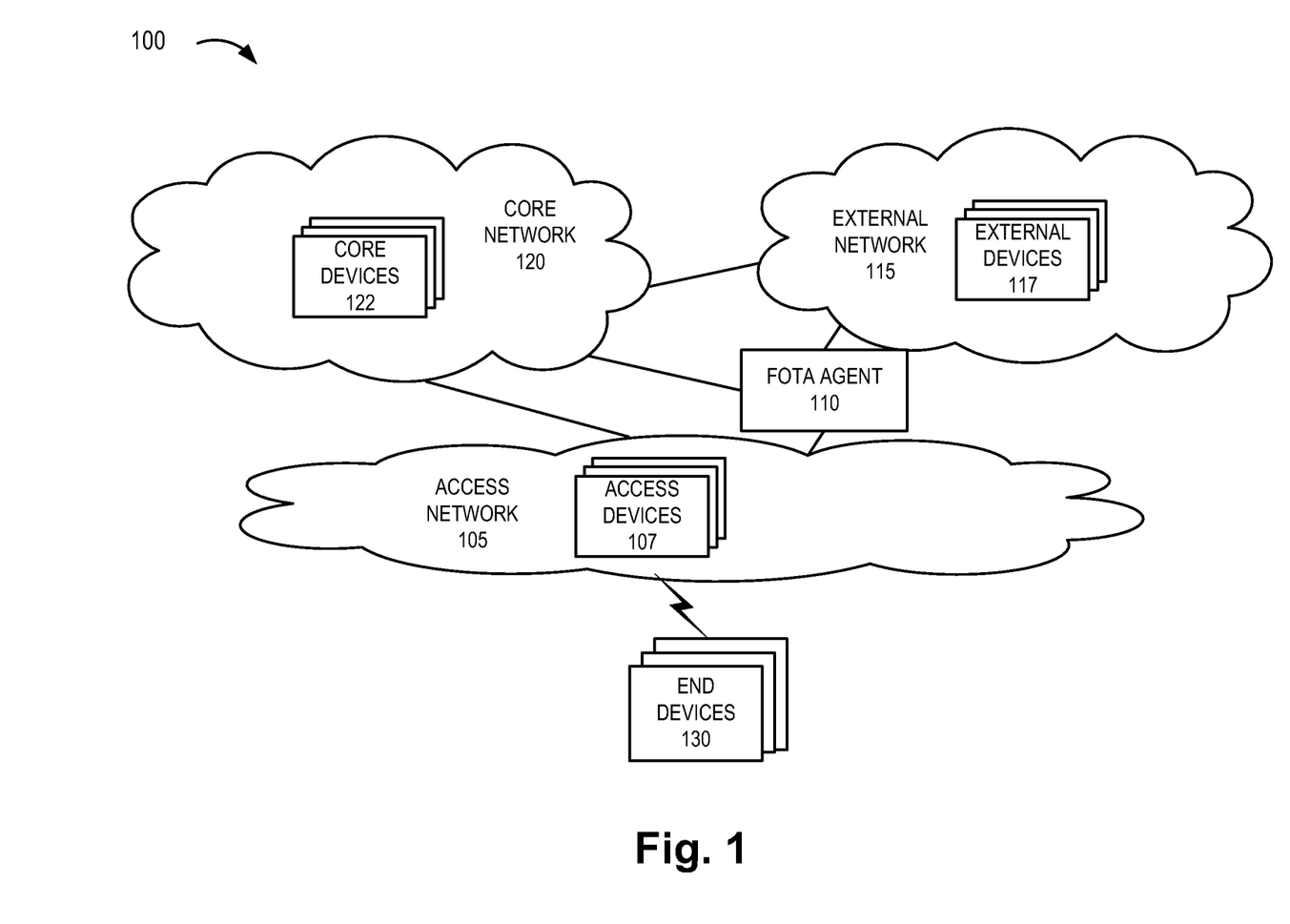
FIG. 1 is a diagram illustrating an environment according to an implementation described herein.

FIG. 1 is a diagram illustrating an exemplary environment 100 in which an exemplary embodiment of the FOTA update campaign service may be implemented. As illustrated, environment 100 includes an access network 105, an external network 115, and a core network 120. Access network 105 includes various network devices such as access devices 107 (also referred to individually or generally as access device 107). External network 115 includes various network devices such as external devices 117 (also referred to individually or generally as external device 117). Core network 120 includes various network devices such as core devices 122 (also referred to individually or generally as core device 122). Environment 100 further includes a FOTA agent 110 device and end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane (CP), a user plane (UP), a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may provide the multi-operator anchor service, as described herein.

Access network 105 may include different and multiple functional splitting, such as options 1, 2, 3, 4, 5, 6, 7, or 8 that relate to combinations of access network 105 and core network 120 including an EPC network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, common public radio interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, mm wave, below 6 gigahertz (GHz), above 6 GHz, higher than mm wave, licensed radio spectrum, unlicensed radio spectrum), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a remote radio head (RRH), a baseband unit (BBU), a radio network controller (RNC), a radio unit (RU), a CU, a CU CP, a CU UP, a DU, a small cell node (e.g., a picocell device, a femtocell device, a microcell device, a home eNB, etc.), an open network device (e.g., O-RAN CU (O-CU), O-RAN DU (O-DU), O-RAN next generation Node B (O-gNB), O-RAN evolved Node B (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some implementations, access device 107 may include an integrated functionality, such as a CU-CP and a CU-UP, or other integrations of split RAN nodes. Access device 107 may be an indoor or an outdoor device. Access device 107 may include a controller device, for example, a RAN intelligent controller (RIC).

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt, radiation pattern, directivity, elevation, planar arrays, and so forth. Depending on the implementation, access device 107 may provide a wireless access service at a cell, a sector, a sub-sector, carrier, and/or other configurable level.

External network 115 may include one or multiple networks of one or multiple types and technologies. For example, external network 115 may be implemented to include a service or an application-layer network, a cloud network, a private network, a public network, a MEC network, a fog network, the Internet, a service provider network, the World Wide Web (WWW), an Internet Protocol Multimedia Subsystem (IMS) network, a Rich Communication Service (RCS) network, an SDN, a virtual network, a packet-switched network, a data center, a cloud network, or another type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services. According to an exemplary embodiment, external devices 117 may include a network device that hosts the OTA update.

Core network 120 may include one or multiple networks of one or multiple network types and technologies. Core network 120 may include a complementary network of access network 105. For example, core network 120 may be implemented to include an NGC or a 5G network, an EPC of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW–C), a UPF with PGW user plane functionality (e.g., UPF+PGW–U), a service capability exposure function (SCEF) with a NEF (SCEF+NEF), and/or other combined nodes (e.g., an HSS with a UDM and/or UDR, an MME with an AMF, etc.).

FOTA agent 110 may include a network device that manages the FOTA update campaign service, as described herein. FOTA agent 110 coordinates FOTA update delivery sessions between end devices 130 and a content delivery network (e.g., external network 115/external devices 117) via a network, such as access network 105 and/or core network 120/core devices 122. According to an exemplary embodiment, the FOTA update campaign service may provide a multi-phase, massive IoT FOTA updating service, as described herein. Depending on the implementation, FOTA agent 110 may determine network resource availability for available access devices 107 that support a FOTA update campaign. For example, FOTA agent 110 may determine a number of existing physical resource blocks (PRBs) and/or radio resource control (RRC) connections with respect to a time of delivery for the FOTA update. Based on the network resource availability, FOTA agent 110 may determine network loading conditions (e.g., percentage of PRB utilizations, etc.). In some implementations, FOTA agent 110 may obtain local RF conditions (e.g., SINR, RSRP), etc.) for each set of IoT UE devices, for example. In some implementations, FOTA agent 110 may obtain UE device subscription or profile information associated with one or more FOTA target devices (e.g., end device(s) 130), such as power saving mode (PSM) features (e.g., discontinuous reception (DRX) configuration, etc.), historical application traffic profile information (e.g., intermittent traffic, continuous traffic, bursty traffic, off-peak time traffic, infrequent traffic, etc.), and/or other relevant characteristics of end device 130.

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2A:
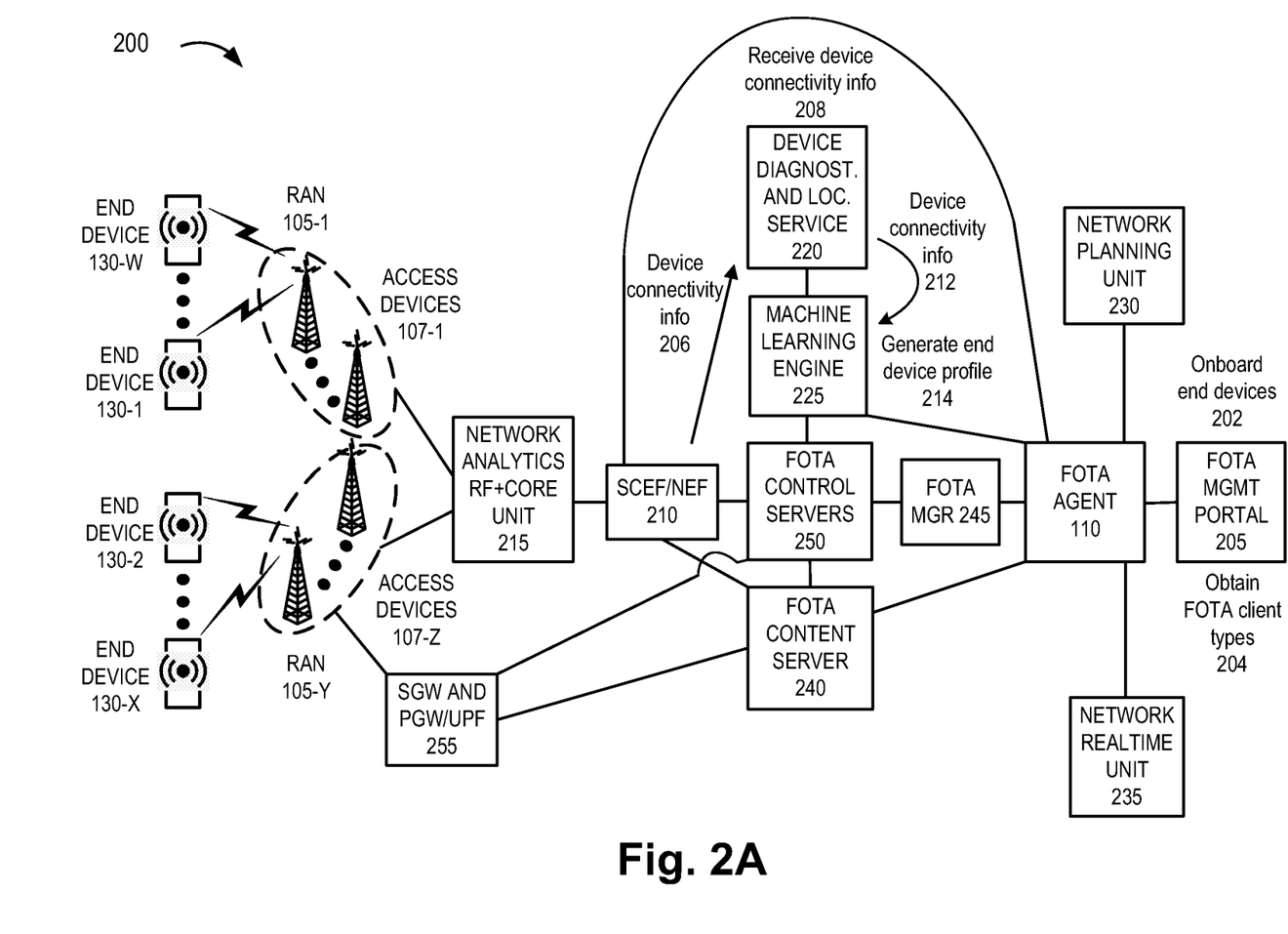
FIGS. 2A-2D are diagrams illustrating exemplary processes of exemplary embodiments of a firmware over-the-air (FOTA) update campaign service.

FIGS. 2A-2D are diagrams illustrating an exemplary network 200 of exemplary embodiments of the FOTA update campaign service, as described herein. Referring to FIG. 2A, as part of a network operator's massive IoT FOTA services, end devices 130 associated with an end user are onboarded 202 into the network operator's IoT management platform, for example, via a FOTA management portal 205 by the end user. The list may include device identifiers including a Mobile Station International Subscriber Directory Number (MSISDN), an International Mobile Subscriber Identity (IMSI), a UE identifier, a Subscription Permanent Identifier (SUPI), an International Mobile Equipment Identity (IMEI), a Mobile Equipment Identifier (MEID), a permanent equipment identifier (PEI), a globally unique identifier (GUI), a temporary identifier, or another suitable user and/or end device identifier), a Public Land Mobile Network (PLMN) identifier, a closed subscriber group identifier, and/or a network address (e.g., a Medium Access Control (MAC) address, an Internet Protocol (IP) address, or another type of network address. In one embodiment, end devices 130 may report their FOTA client type to FOTA agent 110. For example, a client type may include HTTP, Open Mode Alliance-device management (OMA-DM), lightweight M2M (LWM2M), or any other FOTA client type.

FOTA agent 110 may subscribe to an SCEF/NEF 210 and/or other device services, such as device management diagnostics and/or location, for device connectivity information 206 pertaining to end device 130, for example, that may be received 208 at a device diagnostic and location service 220 device. For example, the device connectivity information may include device RAN mode, PSM timer settings, last connect to network timestamp, serving cellID, signal strength, physical location, remaining battery life, etc. Depending on the embodiment, SCEF/NEF 210 may obtain at least some connectivity information from a network analytics RF+core unit 215. In some embodiments, SCEF/NEF 210 may notify FOTA agent 110 when end device 130 connectivity is detected and the availability of device connectivity information. Depending on the embodiment, SCEF/NEF 210 may also notify FOTA agent 110 of the total number of end devices 130 and associated FOTA types that are connected to the serving cellID, and the available bandwidth for a FOTA update campaign. In some embodiments, one or more FOTA update services may be integrated with other device services (e.g., diagnostics and location)

that are available from an entity other than the network operator. FOTA agent 110 may be capable of querying one or more services to receive device connectivity information when SCEF/NEF 210 fails to provide at least some of the device connectivity information.

A machine learning engine 225 may obtain the collected device information 212, and use the information to execute a machine learning algorithm to detect a behavior pattern and generate a profile 214 for each end device 130 based on the behavior pattern. The end device 130 profiles may include information pertaining to which RAN mode is used to connect to the network, the expected device wakeup time, device location moving patterns and corresponding times, the serving cellID congestion/bandwidth usage patterns, or other observable parameters. In some embodiments, end device 130 profiles may be provided to FOTA agent 110.

Figure 2B:
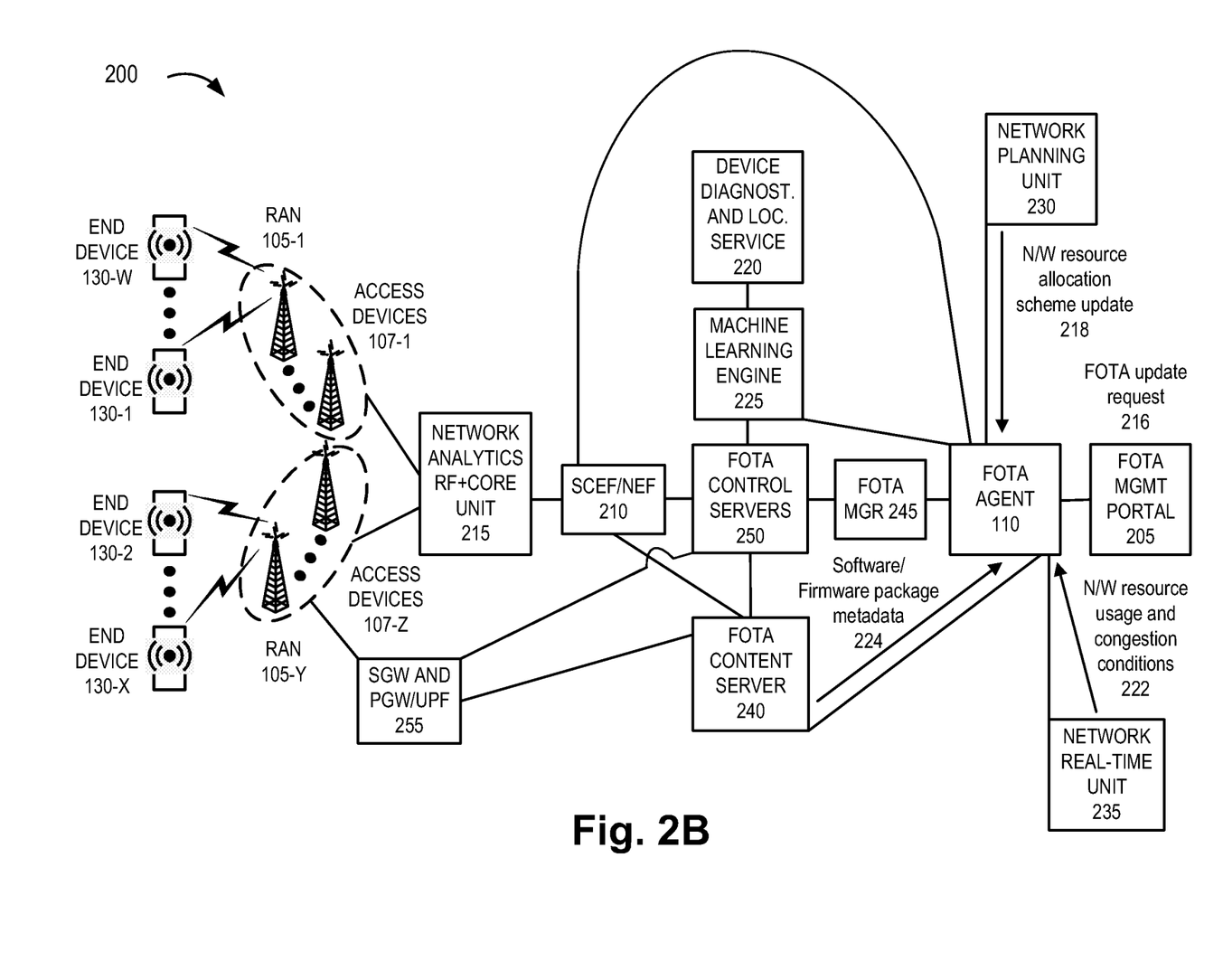

Referring to FIG. 2B, an end user or IoT administrator, for example, may submit a software/firmware update request 216 via FOTA management portal 205. For example, the update request may include a device list that identifies each end device 130, device type (e.g., CAT-M, NIDD, etc.) information associated with each end device 130, an update priority (e.g., urgent, best effort, etc.), software/firmware package type (e.g., baseband, application, critical, bug fix, etc.), file size, one or more preferred time windows (e.g., day of week, time of day, etc.), designated location (e.g., physical address, cell, etc.), and/or acceptance criteria (e.g., completed within an identified timeframe, an update success rate, fragmentation/non-fragmentation, etc.). In some embodiments, update requests from various entities may be assigned relative priorities, for example, according to a service class for the associated subscription of the FOTA service.

FOTA agent 110 may receive a network resource allocation scheme update 218 from a network planning unit 230. For example, based on network performance improvement, the number of CAT-M devices each eNB sector can support concurrently may increase (e.g., from about 100 to about 200, etc.), such that FOTA agent 110 can schedule more end devices 130 for FOTA updates, within each eNB sector, than what is proposed in an initial FOTA update plan. FOTA agent 110 may receive a live feed, from a network real-time unit 235, for network resource usage and congestion conditions 222. For example, if some cells are out of service due to a power outage or other condition, FOTA agent 110 may factor current network condition into any FOTA update scheduling by modifying an initial FOTA update plan.

FOTA agent 110 may obtain the available software or firmware packages metadata 224 associated with the FOTA update request, for example, from a FOTA content server 240. For example, the metadata may identify a type of FOTA update, a name of the FOTA update, a file size of the FOTA update, applicable device make/model, and associated hosting information, such as the CDN location, a URL, or other host identifier.

Figure 2C:
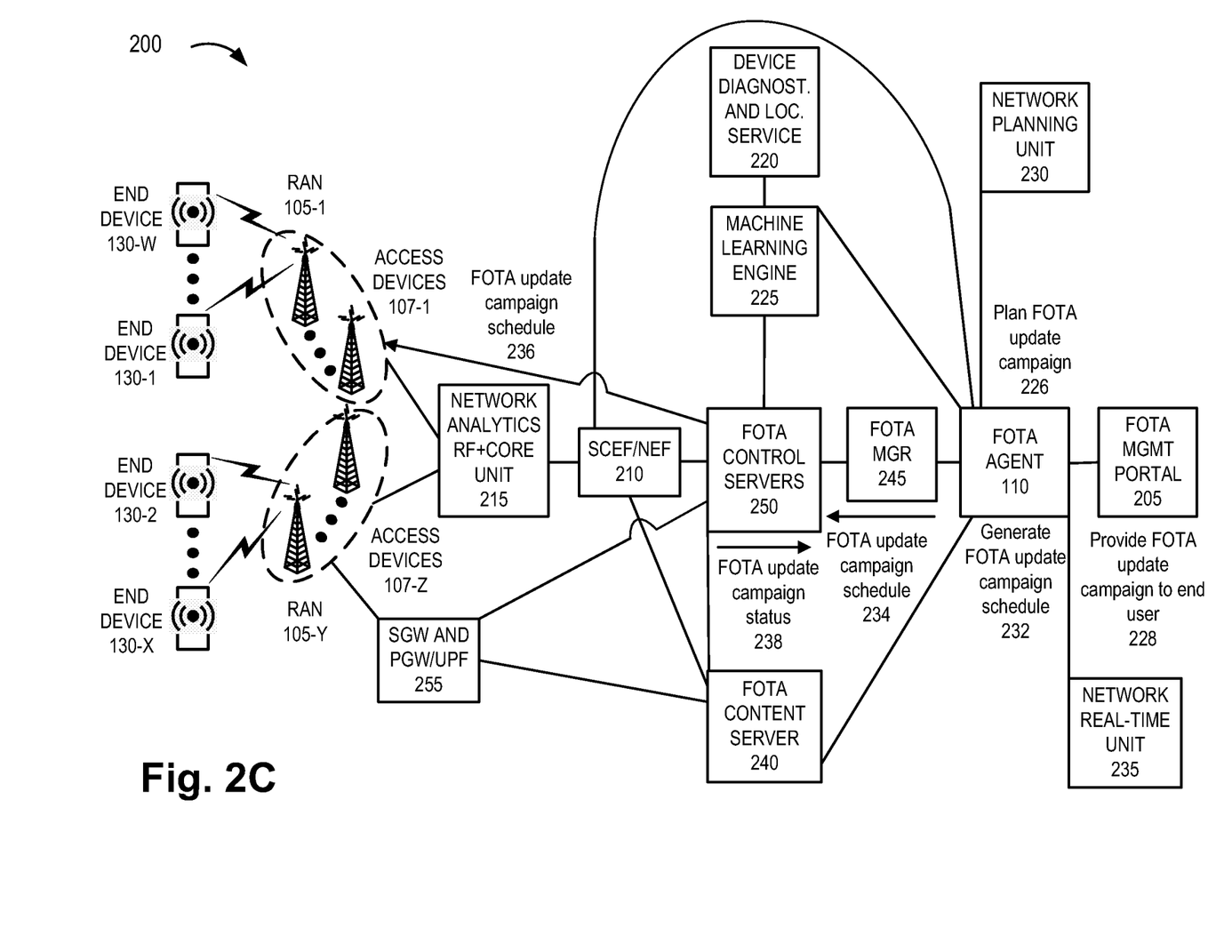

Referring to FIG. 2C, FOTA agent 110 may calculate a FOTA update campaign 226 using an intelligence algorithm responsive to the FOTA update request received from the end user. In some embodiments, FOTA agent 110 may use the network resource information received from network planning unit 230 and network real-time unit 235, the end device profiles generated by machine learning engine 225, and/or the software package availability information from FOTA content server 240. FOTA agent 110 may provide FOTA update campaign planning information to the end user 228, via FOTA management portal 205, for review and/or approval/disapproval. In some embodiments, FOTA agent 110 may provide the FOTA update campaign planning information to the end user only when one or more delivery parameters of the FOTA update campaign plan differs from the FOTA update request (e.g., delivery times window, delivery completion timeframe, delivery locations, delivery modes, etc.), for example, by a threshold amount. In some embodiments, input received from the end user may indicate disapproval of the FOTA update campaign plan, and the end user may be allowed to adjust the original FOTA update request and re-submit a modified FOTA update request. Additionally or alternatively, the end user may adjust end device 130 behavior (e.g., adjust sleep timers, etc.) to correlate with the FOTA update campaign plan. FOTA agent 110 may generate a FOTA update campaign schedule 232 based on approval of the FOTA update campaign plan and/or the modified FOTA update request.

Continuing with FIG. 2C, a FOTA manager 245 may provide the FOTA update campaign schedule 234 to corresponding FOTA control servers 250, for example, based on a location of the host of the software package and/or on end device 130 FOTA client type (e.g., HTTP, OMA-DM, LWM2M, etc.). FOTA servers 250 may provide the FOTA update campaign schedule 236 to end devices 130, via a control plane FOTA file delivery patch through an SGW and PGW/UPF 255. For example, end devices 130 may perform FOTA update file downloads during the schedule time windows and at the schedule locations. FOTA content server 240 may provide the FOTA update to end device 130 via a user plane FOTA delivery path through SGW and PGW/UPF 255 and access devices 107.

FOTA control servers 250 provide near real-time campaign progress status 238 to FOTA manager 245. The progress status information may include statistical data such as successful file downloads, failed file downloads, files remaining, or other statistics. In some embodiments, FOTA manager 245 may analyze the progress status information may determine reasons for failed download, for example, unexpected events occurring with respect to a particular cellID, insufficient bandwidth availability for CAT-M devices, etc.

Figure 2D:
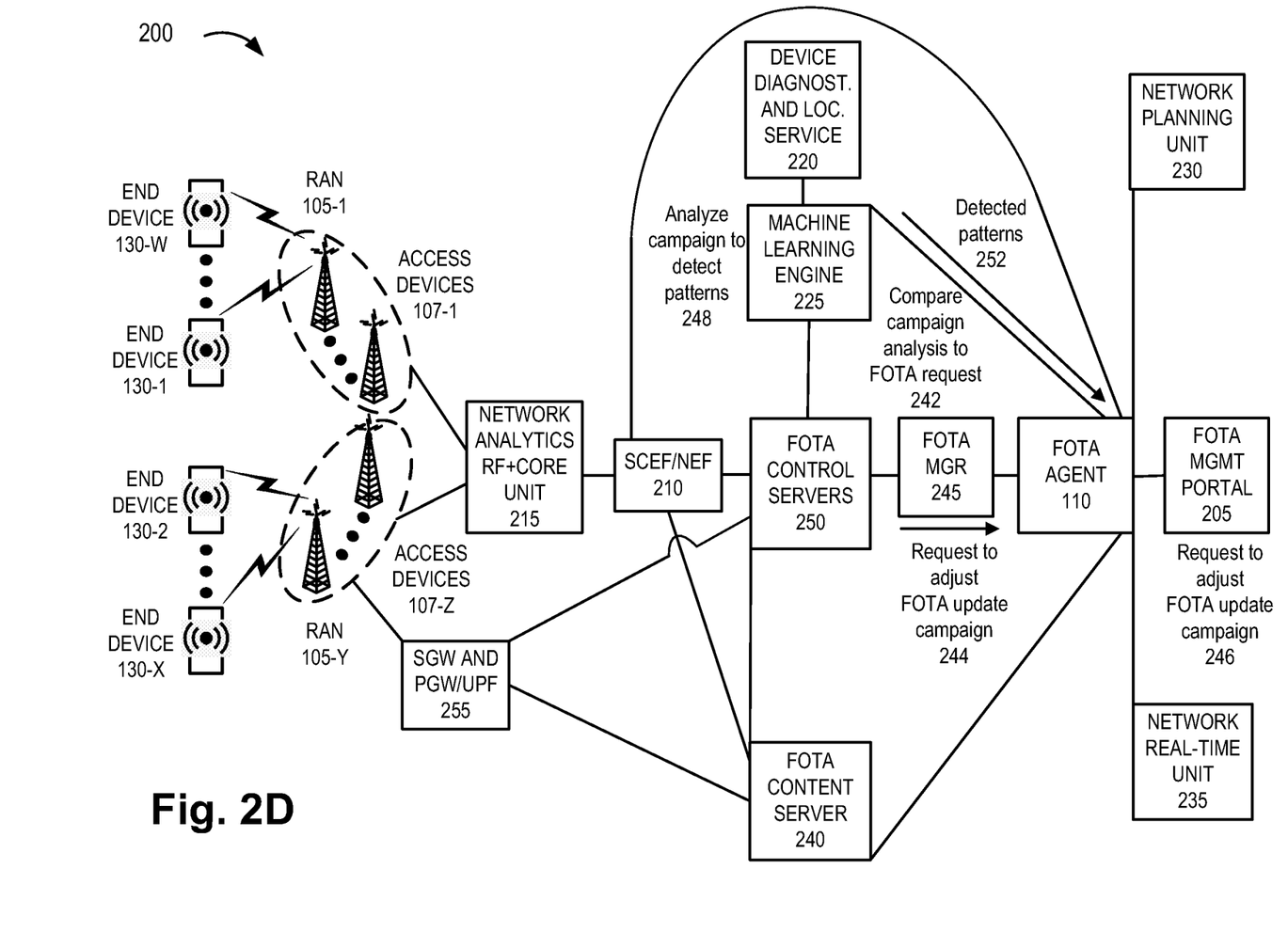

Referring to FIG. 2D, FOTA manager 245 may compare results of the FOTA update campaign analysis to the end user's request for FOTA update 242. Based on the comparison, FOTA manager 245 may determine whether adjustment to the current FOTA update campaign schedule is warranted and/or whether a new FOTA update campaign schedule should be created and implemented. When an adjustment to the ongoing FOTA update campaign schedule or a new FOTA update campaign schedule is needed, a request may be sent 244 to FOTA update agent 125 to adjust/schedule the FOTA update campaign schedule. If no adjustment is necessary, the FOTA update campaign schedule may execute to completion. The completion of the FOTA update campaign may be presented 246 to the end user via FOTA management portal 205 and/or an application programming interface (API) call. Machine learning 225 may analyze the FOTA update campaign results to detect any patterns 248 with respect to end devices 130, RAN 105, FOTA control servers 250, and/or the software/firmware package(s), and the result provided 252 to FOTA agent 110 for future FOTA update campaign scheduling reference.

FIGS. 2A-2D are diagrams illustrating exemplary processes of the FOTA update campaign service, according to other exemplary embodiments, the FOTA update campaign service may include additional, fewer, and/or different steps. The messages illustrated and described are exemplary.

Figure 3:
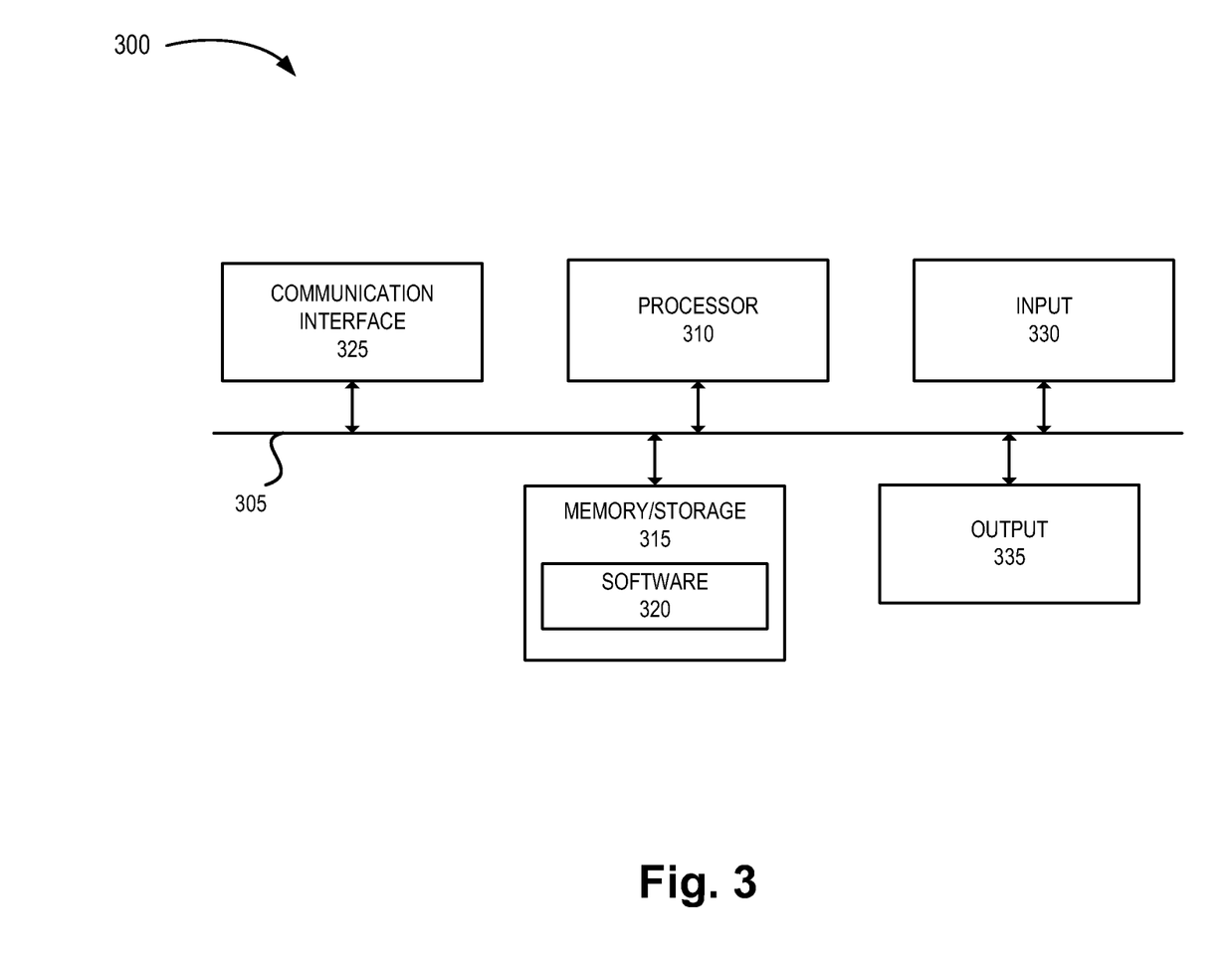
FIG. 3 is a diagram illustrating exemplary components of a device that may be included in a component of FIG. 1 according to an implementation described herein.

FIG. 3 is a diagram illustrating exemplary components of a device 300 that may be included in one or more of the devices described herein. For example, device 400 may correspond to access device 107, external device 117, core device 122, FOTA agent 110, end device 130, and/or other types of network devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium.

Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to FOTA agent 110, software 320 may include an application that, when executed by processor 310, provides a function and/or a process of the multi-operator anchor service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, application programming interface (API), etc.). Communication interface 325 may be implemented as a point-to-point interface, a service-based interface, or a reference interface, for example.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 300 may be implemented in the same manner. For example, device 300 may be instantiated, created, deleted, or some other operational state during its lifecycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 300.

Device 300 may perform a process or a function, as described herein, in response to processor 310 executing software 320 stored by memory/storage 315. For example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
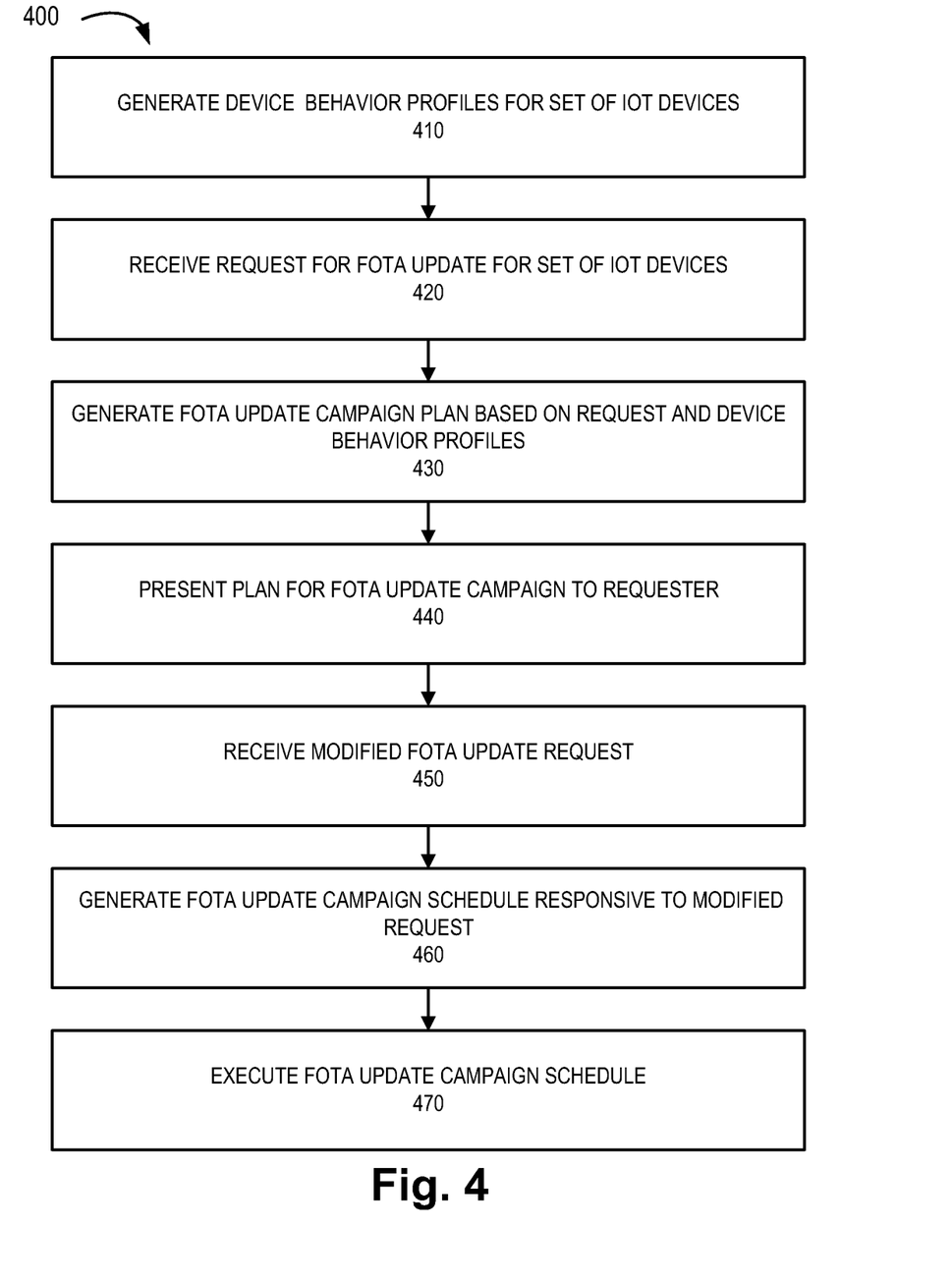
FIG. 4 is a flowchart of a process for executing a FOTA update campaign according to an implementation described herein.

FIG. 4 is a flowchart of a process for executing a FOTA update campaign according to an implementation described herein. In some implementations, a step of the process of FIG. 4 may be performed by end device 130, access devices 107, core devices 122, external devices 117, and/or FOTA agent 110. In other implementations, some or all of the process of FIG. 4 may be performed by another device or a group of devices separate from end device 130, access devices 107, core devices 122, external devices 117, and/or FOTA agent 110.

Assume that a set of end devices (e.g., end devices 130) are onboarded into a network operator's IoT management platform, and that the end device user associated with the set of end devices has provided consent for collection of end device information related to device characteristics and operation. Assume also that based on the consent, the IoT management platform subscribes to services via SCEF/NEF (e.g., SCEF/NEF 210) and/or other integrated device services (e.g., diagnostics, location, etc.), to collect device information as described herein. The process 400 may include the IoT management platform using artificial intelligence to analyze the collected information to generate a behavior profile for each of the end devices (block 420). The behavior profile may indicate what RAN mode each end device uses to connect to the network, expected device wakeup times, device mobility patterns, serving cellID congestion/bandwidth usage pattern, etc., as described herein.

Process 400 may further include receiving a request for FOTA update for the set of IoT devices (block 410), triggering FOTA update campaign planning for the set of end devices. The request may include information indicating a file size associated with the identified FOTA update software/firmware package and/or a list of IDs for the targeted end devices.

Responsive to the request, a FOTA campaign agent (e.g., FOTA agent 110) may generate a FOTA update campaign plan based on the device behavior profiles (block 430), as described herein. The FOTA update campaign plan, including a number of file delivery parameters described herein, may be presented to the end device user (block 440), for example, via a FOTA management portal (e.g., FOTA management portal 205) and/or an API.

Responsive to presenting the FOTA update campaign plan to the end device user, the FOTA campaign agent may receive a modified FOTA update request from the end user (block 450), for example, via the FOTA management portal. For example, the modified FOTA update request may include changes to one or more of the file delivery parameters, respecting the time, location, and/or manner of delivery set forth on the FOTA update campaign plan, relative to one or more of the set of end devices. Based on the modified FOTA update request, the FOTA campaign agent may generate a FOTA update campaign schedule (block 460), which differs from the FOTA update campaign plan, and may reflect current network and/or RF conditions at one or more end device location. The FOTA campaign agent may initiate execution of the FOTA update campaign (block 470) according to the FOTA update campaign schedule. Additionally or alternatively, when no end device user input is received in response to the presentation of presenting the FOTA update campaign plan to the end device user in block 440, the FOTA campaign agent may initiate execution of the FOTA update campaign according to the FOTA update campaign plan in block 470.

According to an exemplary scenario of a FOTA update campaign service for massive IoT FOTA, assume that a bus company submits a FOTA update request to a FOTA system. Assume that the request includes a list of 100 tracking devices installed on 100 buses and the update is a critical security fix. The request may further indicate that firmware can only be safely delivered when the buses are parked in the parking lot or bus barns in the evening hours.

The FOTA system may analyze stored device behavior profiles for each of the 100 tracking devices and determine that 10 of the tracking devices are installed on 10 school buses located in New York City, which are taken out of service each weekday at 5 p.m. EST; 80 of the tracking devices are installed on 80 school buses located in San Jose, Calif., which are taken out of service each weekday at 6 p.m. PST; and 10 of the tracking devices are installed on 10 school buses located in Dallas, Tex., which are taken out of service each weekday at 7 p.m. CST. The FOTA system may generate a FOTA update campaign plan that reflects the location information and other device characteristics in the device profiles (e.g., FOTA type, power saving mode information, etc.), and present the plan to the bus company.

Assume that the bus company re-submits a modified request that further indicates that some of the New York City school buses are now being used in the evening for extracurricular activities, and that the San Jose buses will not be in service during an upcoming week due to a school break. The FOTA system may modify the FOTA update campaign plan based on the re-submitted request, and generate a FOTA update campaign schedule. The FOTA system may push the software/firmware updates according to three separate sub-campaigns to the three location, as set forth in the FOTA update campaign schedule.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 4, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise. The word "exemplary" is used herein to mean "serving as an example."

All structural and functional equivalents to the elements of the various aspects set forth in this disclosure that are known or later come to be known are expressly incorporated herein by reference and are intended to be encompassed by the claims.

What is claimed is:

1. A method comprising:
   generating, by a network device, behavior profiles for a plurality of end devices associated with an end user, wherein the behavior profiles include power saving mode information for each of the end devices;
   receiving, by the network device and from the end user, a request for an over-the-air (OTA) update for the plurality of end devices;
   generating, by the network device, an OTA update campaign plan based on the behavior profiles responsive to the request;
   determining, by the network device, a difference between a first delivery parameter identified in the request and a second delivery parameter identified in the OTA update campaign plan;
   providing, by the network device and based on the difference exceeding a threshold amount, the OTA update campaign plan to the end user;
   receiving, by the network device and from the end user, a modified request for the OTA update, wherein the modified request includes a change to the power saving mode information for at least one of the end devices; and
   generating, by the network device, an OTA update campaign schedule responsive to the modified request.

2. The method of claim 1, further comprising:
   executing an OTA update file transfer to the plurality of end devices according to the OTA update campaign schedule.

3. The method of claim 2, wherein the OTA update campaign schedule includes transmission information comprising an antenna beam pattern and a time of delivery for performing the transfer.

4. The method of claim 1, wherein the OTA update campaign schedule includes a firmware OTA (FOTA) update campaign and wherein the OTA update includes a FOTA update.

5. The method of claim 1, wherein the plurality of end devices includes a Category M (Cat-M) Internet of things (IoT) device or a narrow band IoT (NB-IoT) device.

6. The method of claim 1, wherein the behavior profiles include a mobility location pattern for each of the end devices, and wherein the modified request indicates a change to the mobility location pattern associated with one or more of the plurality of end devices.

7. The method of claim 6, further comprising:
   modifying one or more of the behavior profiles, associated with the one or more of the plurality of end devices, based on the modified request.

8. A network device comprising:
   a processor configured to:
      generate behavior profiles for a plurality of end devices associated with an end user, wherein the behavior profiles include power saving mode information for each of the end devices;
      receive, from the end user, a request for an over-the-air (OTA) update for the plurality of end devices;
      generate an OTA update campaign plan based on the behavior profiles responsive to the request;
      determine a difference between a first delivery parameter identified in the request and a second delivery parameter identified in the OTA update campaign plan;
      provide, based on the difference exceeding a threshold amount, the OTA update campaign plan to the end user;
      receive, from the end user, a modified request for the OTA update, wherein the modified request includes a change to the power saving mode information for at least one of the end devices; and
      generate an OTA update campaign schedule responsive to the modified request.

9. The network device of claim 8, wherein the processor is further configured to execute an OTA update file transfer to the plurality of end devices according to the OTA update campaign schedule.

10. The network device of claim 9, wherein the OTA update campaign schedule includes transmission information comprising an antenna beam pattern and a time of delivery for performing the transfer.

11. The network device of claim 8, wherein the OTA update campaign schedule includes a firmware OTA (FOTA) update campaign and wherein the OTA update includes a FOTA update.

12. The network device of claim 8, wherein the plurality of end devices includes a Category M (Cat-M) Internet of things (IoT) device or a narrow band IoT (NB-IoT) device.

13. The network device of claim 8, wherein the behavior profiles include a mobility location pattern for each of the end devices, and wherein the modified request indicates a change to the mobility location pattern associated with one or more of the plurality of end devices.

14. The network device of claim 13, wherein the processor is further configured to:
    modify one or more of the behavior profiles, associated with the one or more of the plurality of end devices, based on the modified request.

15. A non-transitory computer-readable memory device storing instructions executable by a processor of a network device that when executed cause the network device to:
    generate behavior profiles for a plurality of end devices associated with an end user, wherein the behavior profiles include power saving mode information for each of the end devices;
    receive, from the end user, a request for an over-the-air (OTA) update for the plurality of end devices;
    generate an OTA update campaign plan based on the behavior profiles responsive to the request;
    determine a difference between a first delivery parameter identified in the request and a second delivery parameter identified in the OTA update campaign plan;
    provide, based on the difference exceeding a threshold amount, the OTA update campaign plan to the end user;
    receive, from the end user, a modified request for the OTA update, wherein the modified request includes a change to the power saving mode information for at least one of the end devices; and
    generate an OTA update campaign schedule responsive to the modified request.

16. The non-transitory computer-readable memory device of claim 15, wherein the instructions further cause the network device to execute an OTA update file transfer to the plurality of end devices according to the OTA update campaign schedule.

17. The non-transitory computer-readable memory device of claim 15, wherein the OTA update campaign schedule includes a firmware OTA (FOTA) update campaign and wherein the OTA update includes a FOTA update.

18. The non-transitory computer-readable memory device of claim 15, wherein the plurality of end devices includes a Category M (Cat-M) Internet of things (IoT) device or a narrow band IoT (NB-IoT) device.

19. The non-transitory computer-readable memory device of claim 15, wherein the behavior profiles include a mobility location pattern for each of the end devices, and wherein the modified request indicates a change to the mobility location pattern associated with one or more of the plurality of end devices.

20. The non-transitory computer-readable memory device of claim 19, wherein the instructions further cause the network device to:
    modify one or more of the behavior profiles, associated with the one or more of the plurality of end devices, based on the modified request.

* * * * *